(12) United States Patent
Hoff (10) Patent No.: US 9,348,734 B2
(45) Date of Patent: May 24, 2016

(54) GENERATION OF AUTOMATED TESTS FOR BUSINESS SOFTWARE SOLUTION PACKAGES

(75) Inventor: Roland Hoff, Walldorf (DE)

(73) Assignee: SAP SE, Walldorf (DE)

( * ) Notice: Subject to any disclaimer, the term of this patent is extended or adjusted under 35 U.S.C. 154(b) by 820 days.

(21) Appl. No.: 13/336,483

(22) Filed: Dec. 23, 2011

(65) Prior Publication Data

US 2013/0167121 A1 Jun. 27, 2013

(51) Int. Cl.
*G06F 9/44* (2006.01)
*G06F 11/36* (2006.01)

(52) U.S. Cl.
CPC .................. *G06F 11/3684* (2013.01)

(58) Field of Classification Search
USPC .......................................................... 717/124
See application file for complete search history.

(56) References Cited

U.S. PATENT DOCUMENTS

| | | | | |
|---|---|---|---|---|
| 6,907,546 B1 * | 6/2005 | Haswell | .............. | G06F 11/3684 714/38.11 |
| 6,957,420 B2 * | 10/2005 | Hand, Jr. | ............. | G06F 11/3664 714/32 |
| 8,856,594 B2 * | 10/2014 | Kurapati et al. | ................. | 714/27 |
| 2003/0046626 A1 * | 3/2003 | Hand, Jr. | ............. | G06F 11/3664 714/738 |
| 2005/0166094 A1 * | 7/2005 | Blackwell | ........... | G06F 11/3664 714/38.14 |
| 2005/0204332 A1 * | 9/2005 | Krishnan et al. | .............. | 717/102 |
| 2006/0230314 A1 * | 10/2006 | Sanjar | ....................... | G06F 8/61 714/26 |
| 2007/0168970 A1 * | 7/2007 | Li | .......................... | G06F 9/5038 717/124 |
| 2008/0086499 A1 * | 4/2008 | Wefers et al. | ................. | 707/102 |
| 2008/0092119 A1 * | 4/2008 | Sweis | ........................... | 717/124 |
| 2012/0284703 A1 * | 11/2012 | Hoff et al. | ..................... | 717/174 |
| 2012/0296687 A1 * | 11/2012 | Satyanarayana et al. | .... | 705/7.22 |
| 2013/0007522 A1 * | 1/2013 | Kurapati et al. | ................ | 714/32 |
| 2013/0167121 A1 * | 6/2013 | Hoff | .............................. | 717/124 |
| 2013/0219374 A1 * | 8/2013 | Jain | ........................... | G06F 8/30 717/131 |
| 2014/0040867 A1 * | 2/2014 | Wefers | ................ | G06F 11/3684 717/131 |

* cited by examiner

*Primary Examiner* — Marina Lee
(74) *Attorney, Agent, or Firm* — Schwegman Lundberg & Woessner, P.A.

(57) ABSTRACT

Systems and methods to provide generation of automated tests for business software solution packages are provided. In example embodiments, a user selection of a selection option that customizes a solution package for a process is received. A customized solution package is created based on the user selection of the selection option. An automated test comprising a predefined test unit assigned to the user selection of the selection option is generated. The automated test is executed to determine operability of the customized solution package.

20 Claims, 6 Drawing Sheets

GENERATION OF AUTOMATED TESTS FOR BUSINESS SOFTWARE SOLUTION PACKAGES

FIELD

The present disclosure relates generally to software testing, and in a specific example embodiment, to generation of automated tests for business software solution packages.

BACKGROUND

Standard business software provides a single software code that can cover specific needs of many different companies. However, installation of such standard business software may require customization of features that are relevant to a particular user (e.g., company, business, organization). In some cases, solution packages (e.g., rapid deployment solutions, productized solution packages), which bundle a reasonable scope of well-defined business processes, may be provided to the user. However, after customization of a solution package, testing of the processes, process steps, and functionalities needs to be performed. These tests are often tedious to set up and run. For example, a software implementation process may take nine months to perform of which testing all of the settings and customization takes significant time and effort resulting in, for example, a two to three month testing period.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for providing automated tests for business software solution packages are provided. A solution package comprises a set of configurations and settings for business software that may be customized to business process requirements of the customer (e.g., user or business). The solution package may be any type of hardware, software, or combination thereof that can be used to implement the business process at a business system (e.g., of a customer). Accordingly, the solution package may be an implementation of the business process at the business system. For example, the solution package may be an executable software module that can be installed at the business system. Alternatively, the solution package may be a portion of the business process.

In example embodiments, a user selection of a selection option that customizes a solution package for a process is received. A customized solution package is created based on the user selection of the selection option. An automated test comprising a predefined test unit assigned to the user selection of the selection option is generated. Accordingly, a plurality of predefined test units for the solution package is maintained whereby each test unit of the plurality of predefined test units is assigned to a selection option of a plurality of selection options of the solution package. As such, the generating of the automated test comprises retrieving a test unit from the plurality of predefined test units that is assigned to the selection option selected by the user selection. The automated test is executed to determine operability of the customized solution package. In some embodiments, the automated test is automatically executed upon generation of the automated test.

By using embodiments of the present invention, tests are automatically generated based on the customizations implemented in a solution package. Accordingly, one or more of the methodologies discussed herein may obviate a need for manually creating tests, manually providing data for the test, and manually running tests, which may have the technical effect of reducing computing resources used by one or more devices within the system. Examples of such computing resources include, without limitation, processor cycles, network traffic, memory usage, storage space, and power consumption.

Figure 1:
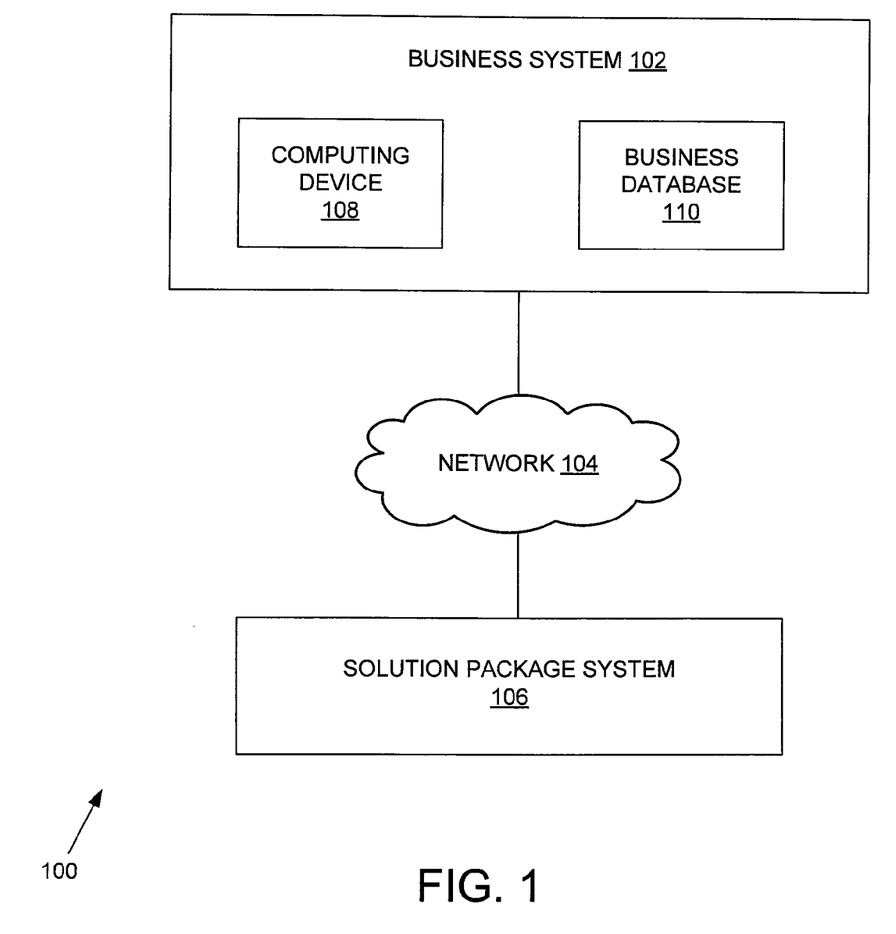
FIG. 1 illustrates an environment in which example embodiments of the inventive subject matter may be practiced.

With reference to FIG. 1, an environment 100 in which example embodiments of the inventive subject matter may be practiced is shown. The environment 100 comprises a business system 102 communicatively coupled via a network 104 to a solution package system 106. The business system 102 may be located at a location of a business or customer and manages data specific to the business needs of the customer. For example, the business system 102 may comprise a customer enterprise resource planning (ERP) system. However, the business system 102 may comprise any logistical system which utilizes software and solution packages.

The business system 102 comprises a computing device 108 and a business database 110. The computer device 108 may be any device that allows a user at the business system 102 to upload or download software packages and solution packages and allows the user to configure such solution packages. The business database 110 may locally store the software packages and solution packages for the business system 102. For example, the computing device 108 may download a software package from the solution package system 106 and store the downloaded software package in the business database 110.

In example embodiments, the business system 102 is linked via the network 104 with the solution package system 106 to allow the solution package system 106 to provide software packages and solution packages including automatically generated tests or test results to the business system 102. The network 104 may comprise the Internet, a wireless network, a cellular network, a Wide Area Network (WAN), or any other type of network which allows for exchange of communications.

In one embodiment, the solution package system 106 may be part of an on-demand system which is hosted by a service provider. The on-demand system comprises one or more network applications that provide services and support to a customer (e.g., business) without the customer having to host the system on their premises. That is, the service provider hosts (e.g., offers, provides, implements, executes, or performs one or more operations of) the systems and the customer can assess functionalities online through a software-as-a-service (SanS) model. The on-demand systems may include, for example, services and support for supply chain management, human resource management, customer relationship management (CRM), financial and accounting management, compliance management, supplier relationship management, software management, or any other form of management. The solution package system 106 will be discussed in more detail in connection with FIG. 2 below.

The environment 100 of FIG. 1 is merely an example and alternative embodiments may comprise any number of business systems 102 communicatively coupled to any number of solution package systems 106. Furthermore, components and functions of the business system 102 and the solution package system 106 may be combined, separated, or located elsewhere in the environment 100. For example, the solution package system 106 may be located within the business system 102 and exchange data via a local area network (LAN). Additionally, while examples will be discussed herein with respect to a business process being a sales process, it is noted that example embodiments may be applied to any type of business process.

Figure 2:
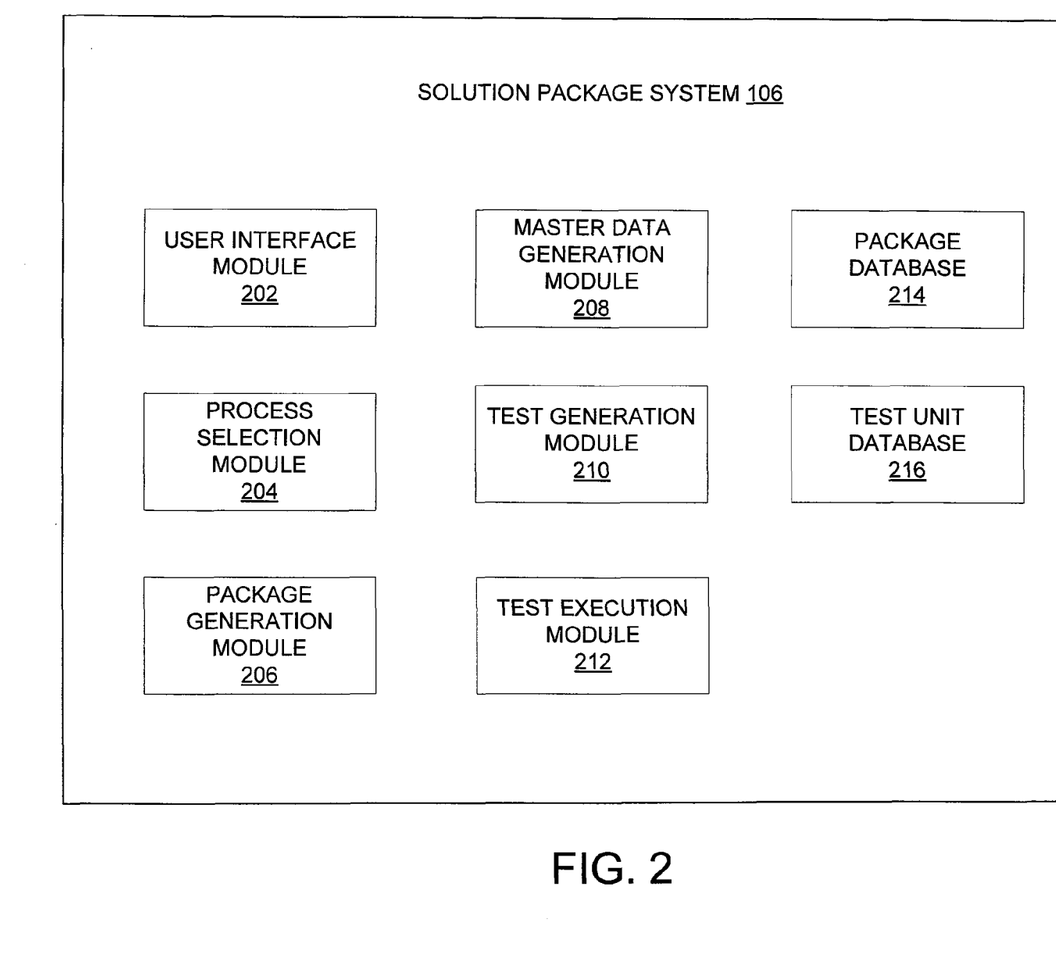
FIG. 2 is a block diagram illustrating a solution package system.

FIG. 2 is a block diagram illustrating the solution package system 106 in further detail. The solution package system 106 is configured to define/customize a solution package associated with business software. As such, the solution package system 106 may facilitate user selection of configurations and settings (e.g., process steps, functions) for the business software. Additionally, the solution package system 106 generates example master data that will be used to run tests on customized solution packages as well as generating the actual tests in an automated manner. Accordingly, the solution package system 106 may comprise a user interface module 202, a process selection module 204, a package generation module 206, a master data generation module 208, a test generation module 210, a test execution module 212 as well as a package database 214 and a test unit database 216, all of which may be communicatively coupled together. The package database 214 may store solution packages that can be accessed in a hosted embodiment or that can be downloaded in a non-hosted embodiment (e.g., where the business system 102 stores and locally configures the solution packages).

The user interface module 202 is configured to provide a user interface that allows the user at the business system 102 to customize a solution package, trigger generation of example master data, and automatically generate tests. An example user interface will be discussed in more detail in connection with FIG. 5 below.

The process selection module 204 is configured to process user selections. Accordingly, the process selection module 204 provides various selection options to the user via the user interface module 202 and receives the user selections in return. The user selections may include one or more selections of process steps, parameters, or functionalities that the user wants to include in their business process. For example, the user can select country, language, industries, and other detailed selection options (e.g., processes, variants within processes, process steps, and functional parameters). With respect to countries, not only are there language differences but also business process differences especially in relations to financial and HR processes. In particular, the parameters of country and industry are important as more solution packages are built to cover various business processes that differ based on location and industry type.

Some selections may be associated with a subset of process steps. For example, a selection to process a sale order may include a subset of process steps directed to handling credit cards or detecting if a promotion or campaign is involved. It is noted that in some embodiments, mandatory process steps may be defined in the solution package. These mandatory process steps provide standard processes that define core functionality in the business process. Thus, the resulting customized solution package may include the mandatory process steps as well as any user selected (optional) process steps and functions as well as any selected parameters or attributes.

The package generation module 206 is configured to define or generate a customized solution package based on the user selections. As such, the package generation module 206 receives the user selections from the process selection module 204 and along with any mandatory process steps generates the customized solution package for the business process. In some embodiments, the customized solution package can include databases, executable software modules, and files. In example embodiments, the configuration or customization of the solution package is based on configuration building blocks. A matrix of building blocks (which contain configuration settings), processes, and selection options may exist. Algorithms are used to find the proper building blocks based on user selections.

The master data generation module 208 generates example master data that will be used in testing the customized solution package. In example embodiments, the master data generation module 208 may access the business database 110 of the business system 102 and extract the example master data. As such, the example master data includes real world data that is specific to the business. The example master data is generated (e.g., extracted) based on the user selections received by the process selection module 204. For example, if a user selection for a sales process includes using a credit card, example master data include pre-existing customers that have purchased items using a credit card, employees, prices, and products.

The test generation module 210 generates one or more tests in an automated manner based, in part, on the user selections received by the process selection module 204. In example embodiments, the test is generated from single test units that are defined test units which are pre-existing in the solution package system 106 (e.g., in the solution package). Each defined test unit may be defined for one or more selection options. That is, during design of the solution package, a developer may assign predefined test units to selection parameters (e.g., selection options) of the solution package. The assignment may be replaced with conditions whereby potential values of the selection parameters may serve as input. During runtime (e.g., when the user is implementing the solution package by customizing it), only the selection of the parameters is needed. As a result, all necessary example master data and test units may be automatically generated and the automated tests may be performed automatically upon receipt of the user selection which includes the parameters for generating and executing the tests.

In some embodiments, the defined test units are stored in the test unit database 216. In other embodiments, the defined test units may be a part of the solution package being customized and is stored in the package database 214 or in the business database 110 (e.g., in embodiments where the solution package is downloaded and stored to the business system 102) in connection with the solution package. Accordingly, the test generation module 210 retrieves the defined test units based on the user selections and generates the test using the corresponding defined test units. In one embodiment, an algorithm to retrieve the define test unit is utilized. Alternatively, a lookup in a table or matrix may be performed to determine the proper defined test units to use in generating the tests.

Once the test is generated by the test generation module 210, the test execution module 212 can execute the test. In example embodiments, the test execution module 212 obtains the example master data from the master data generation module 208 and uses the example master data in the test. The result may indicate whether the user selections in the customized solution package are OK. Additionally, the test execution module 212 may generate reports and documents based on the tests. In some embodiments, the documents may be sample documents that the business process is configured to generate. For example, if the business process is for a sales order process, then documents that may be generated include a sales order, delivery documents, and a sales invoice. Thus, the test execution module 212 may, based on the test, generate sample sales orders, delivery documents, and sale invoices. The results of the test may then be returned to the user by the test execution module 212 via the user interface as an attachment or as a link to the sample documents.

Figure 3:
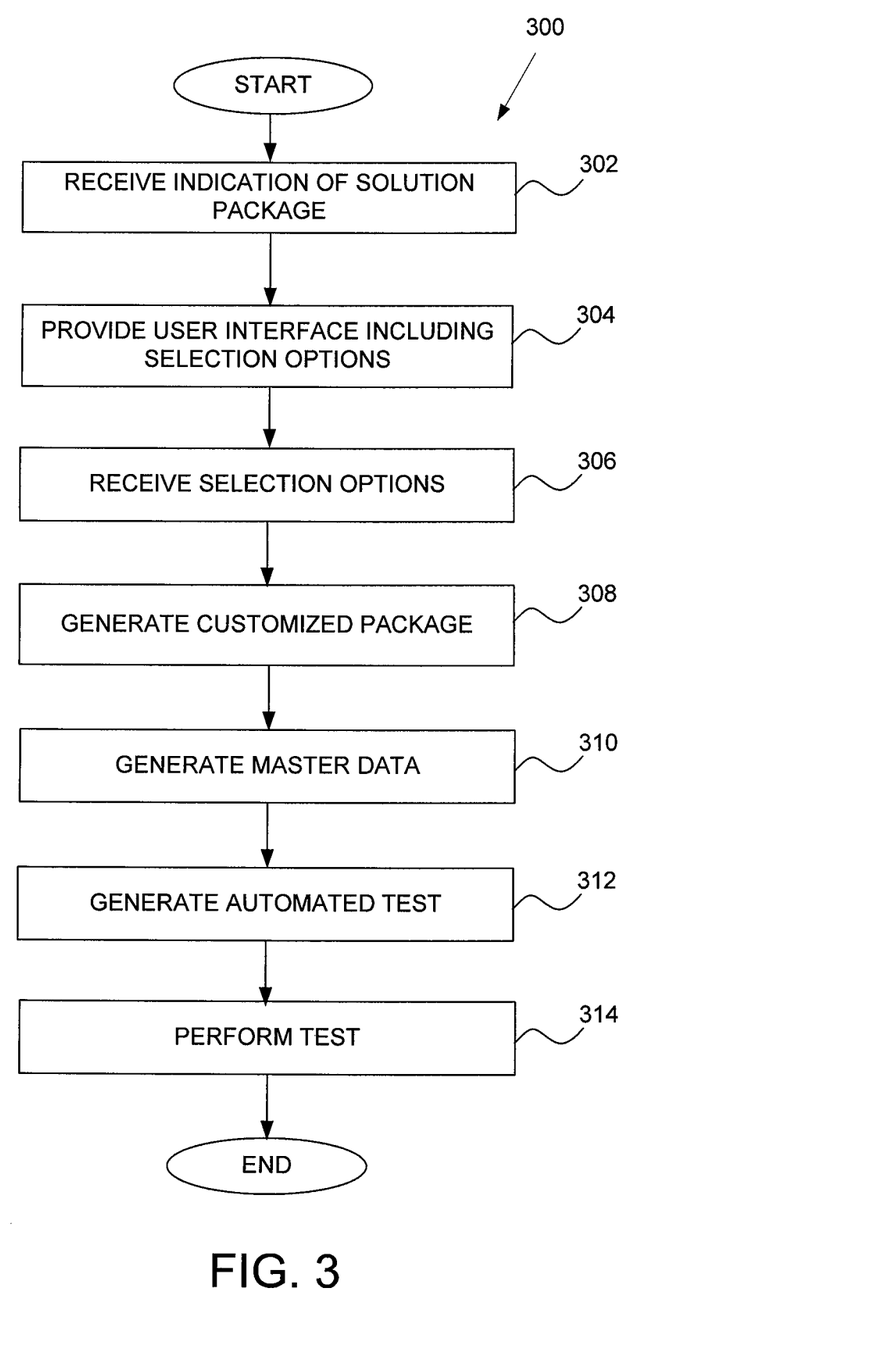
FIG. 3 is a flowchart of an example method for generation of automated tests for business software solution packages.

FIG. 3 is a flowchart of an example method 300 for generation of automated tests for business software solution packages. Example embodiments provide tests that fit the exact user selections and customized solution package that is generated. In one embodiment, the customization and automated test generation occurs at a host system (e.g., the solution package system 106 coupled via the network 104 to the business system 102). In an alternatively embodiment, the customization and automated test generation occurs at the business system 102, itself (e.g., the solution package is stored and customized locally). In these embodiments, the modules of the solution package system 106 are located at the business system 102. In operation 302, an indication of the solution package to be customized is received. In one embodiment, the process selection module 204 receives this indication from the computing device 108. The process selection module 204 accesses the solution package (e.g., stored in the package database 214) and determines selection options for the solution package.

In operation 304, a user interface including the selection options is provided to the user at the computer device 108 that is customizing the solution package. The user interface is provided by the user interface module 202.

In operation 306, one or more user selections of the selection options are received. In example embodiments, the process selection module 204 receives the user selections. The user selections may include one or more selections of process steps or functionalities that the user wants to include in their business process. The user selections may also include parameters or attributes for the solution package. For example, the user can select country, language, industries, and other detailed selection options (e.g., processes, variants within processes, process steps, and functional parameters).

A customized solution package is generated in operation 308. In example embodiments, the package generation module 206 defines or generates the customized solution package based on the user selections from the process selection module 204. Using these user selections along with any mandatory process steps, the customized solution package for the business process is generated. In some embodiments, the customized solution package can include databases, executable software modules, and files. In other embodiments, the user may provide some manual inputs to generate the customized solution package.

In some embodiments, the example master data is automatically generated in operation 310 once the customized solution package is generated. The master data generation module 208 generates the example master data that will be used in testing the customized solution package. Accordingly, the master data generation module 208 may access the business database 110 of the business system 102 and extract the example master data based on the user selections received in operation 306. For example, if a user selection for a sales process includes a sales process using a credit card, example master data may be generated using pre-existing customers that have purchased items using a credit card, employees, or products. In an alternative embodiment, the master data is generated upon receiving an indication or trigger to generate the example master data.

Subsequently, the test generation module 210 generates one or more tests in operation 312. The tests are generated based, in part, on the user selections received in operation 306. In example embodiments, the test is generated using defined test units that are pre-existing in the solution package system 106 (e.g., in the solution package). Each defined test unit may be defined for one or more selection options. In some embodiments, the defined test units may be stored in the test unit database 216, the package database 214, or in the business database 110. Accordingly, the test generation module 210 retrieves the defined test units based on the user selections and generates the test using the defined test units. In one embodiment, an algorithm to retrieve the define test unit is utilized. Alternatively, a lookup in a table or matrix may be performed to determine the proper defined test units to retrieve. The tests may be generated automatically upon the generation of the customized solution package or upon the generation of the example master data. Alternatively, the tests may be generated upon receiving an indication or trigger to generate the automated test.

Once the test is generated by the test generation module 210, the test is performed in operation 314. In some embodiments, the test is automatically performed once the test is generated. In other embodiments, the user at the computing device 108 may trigger the test execution. In example embodiments, the test execution module 212 executes the test using the example master data generated in operation 310. The result may indicate whether the user selections in the customized solution package are OK and may include sample generated documents or links to the generated documents.

Figure 4:
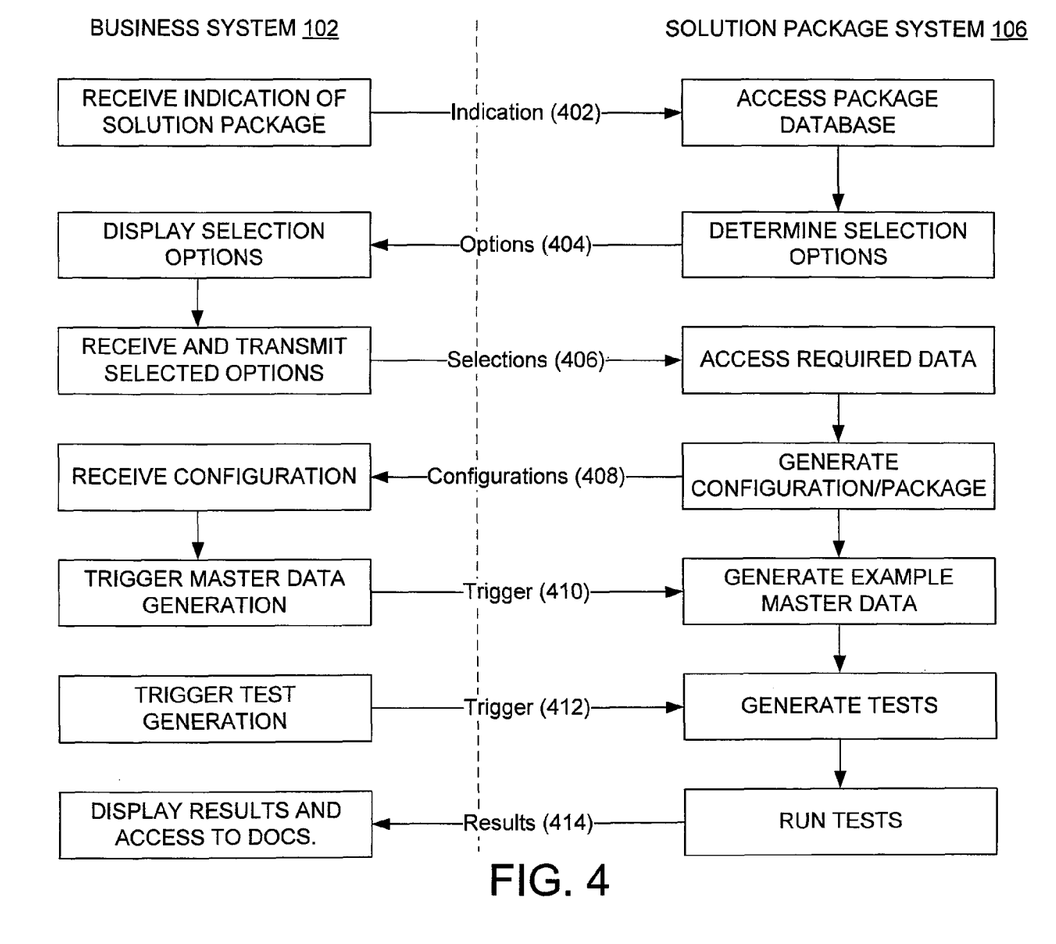
FIG. 4 is a data flow diagram illustrating the generation of automated tests for business software solution packages.

FIG. 4 is a data flow diagram illustrating the generation of automated tests for business software solution packages. Initially, the business system 102 receives an indication of a solution package to be customized from a user. The indication may include an identifier that identifies the solution package. This indication is transmitted (402) to the solution package system 106.

Based on the identifier of the solution package, the package data 214 is accessed to retrieve data associated with the solution package. The data may include both mandatory process steps and selection options from which the user may choose. The selection options are determined and sent within a user interface (404) back to the business system 102 where the selection options (along with any mandatory process steps) are displayed to the user.

The user may then determine which selection options are desired and provide a user selection of the selection options to the business system 102. The user selections are then transmitted back (406) to the solution package system 106. In response, any required data that is needed to generate the customized solution package may be accessed (e.g., the package generation module 206 may retrieve this data from the package database 214) and used to generate the customized solution package. The customized solution package may be sent back (408) to the business system 102.

The user at the business system 102 may then trigger a master data generation process by sending a trigger (410) to the solution package system 106. Based on the customized solution package (e.g., using the user selections), example master data is generated. The example master data may use existing real-world data from the business system 102. As such, the solution package system 106 may access data stored at the business data 110 to generate the example master data (data flow not shown). Alternatively, the master data may be generated automatically upon generation of the customized solution package.

In one embodiment, the user at the business system 102 may then trigger a test generation process by sending a trigger (412) to the solution package system 106. Based on the customized solution package (e.g., using the user selections), one or more tests are generated. In other embodiments, the tests may be automatically generated upon the generation of the customized solution package or the generation of the example master data.

In some embodiments, the generation of the tests will automatically cause the execution of the generated tests. In alternative embodiments, the user may also provide a trigger to run the generated tests. Once the test is complete, the results are provided (414) to the user at the business system 102. The results are displayed to the user and sample documents or links (e.g., a hyperlink) to samples documents generated using the example master data are provided. The user may view these sample documents to determine whether the sample documents are correctly formatted and contain the proper information.

Figure 5:
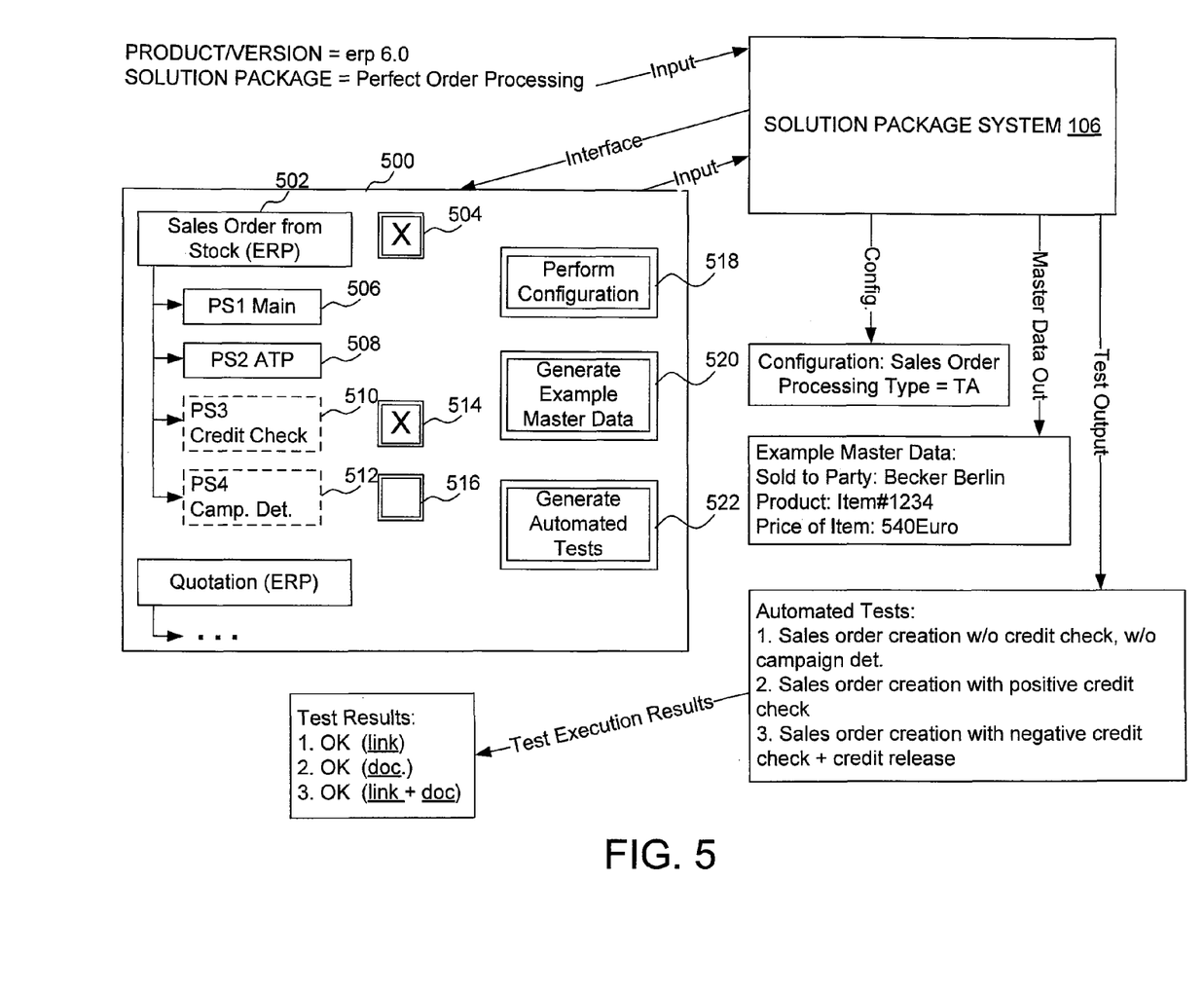
FIG. 5 is a diagram illustrating one example for generation of automated tests for business software solution packages.

FIG. 5 is a diagram illustrating one example for generation of automated tests for business software solution packages. Initially, an indication of the solution package is sent as an input to the solution package system 106. The indication indicates the solution package that the user has that the user wants to customize. In the present example, the solution package is titled "Perfect Order Processing."

Based on the indication, the solution package system 106 provides an interface 500 to the user. The interface 500 includes both mandatory and selection options that allow for customization of the solution package. In the example, the solution package includes a selectable business process "Sales Order from Stock (ERP)" among other processes (e.g., "Quotation (ERP)"). The user may scroll through the interface 500, for example, to select these other processes. The user selects to include sales order from stock process 502 by checking a selection box 504 next to this process step. Accordingly, a subset of processing steps is selectable. The subset includes mandatory process steps (e.g., process step "Main" 506 and process step "ATP" 508) and optional selections (e.g., process step "Credit Check" 510 and process step "Campaign Detection" 512). The mandatory process steps do not have a corresponding selection box associated thereto, whereas the optional selections each have a selection box 514 and 516. In the present example, the user has selected the selection box 514 for the optional process step of credit check 510.

As discussed above during design time, predefined test units are assigned to selection parameters. For example, the test unit (1) "Sales order creation without credit check, without campaign determination" is assigned to the selection option for the whole business process "Sales Order from Stock (ERP)." The test units (2) "Sales order creation with positive credit check" and (3) "Sales order creation with negative credit check" are assigned to the selection option for the process step "Credit Check" 510.

Once the selections are complete, the user may then select a perform configuration button 518. The selection of the perform configuration button 518 sends the user selections back to the solution package system 106 as another input. Using the user selections, the solution package system 106 configures the sales order processing type of the solution package resulting in a customized solution package.

The user may also select a generate example master data button 520 on the interface 500 to trigger the generation of the example master data. The trigger is transmitted to the solution package system 106 as an input and causes the generation of the example master data. In the present example, the example master data includes a customer, a product number, and a price. However the type of data generated as master data is dependent on the user selections and the customized solution package. Ideally, only example master data that is necessary for running tests of the customized solution package are generated.

The user may also be presented a generate automated tests button 522 on the interface 500. The selection of the generate automated tests button 522 will trigger the solution package system 106 to generate the automated tests. Because credit checks may only be applicable to some customers of the business, a valid test case is a sales order creation without credit check and campaign determination. As such, this test may be a valid test independent of the user selections. Additionally, tests may be based on having the credit check turned on but with the campaign detection turned off. Example master data and configuration settings may be provided where the credit checks give a positive result and one with a negative result. Accordingly, the tests include (1) a sales order creation without credit check and without campaign detection test, (2) a sales order creation with positive credit check test, and (3) a sales order creation with negative credit check and credit release test.

It is noted that while the user interface 500 provides a generate example master data button 510 and a generate automated tests button 522, other embodiments may automatically perform the generation of the example master data and the generation of the automated test as well as execution of the test based on a single trigger (e.g., selection of the perform configuration button 518). That is, the user only needs to provide the user selections and the solution package system 106 will automatically generate the example master data and the automated tests and then execute the test automatically using the example master data.

For the given selection of the example of FIG. 5, the generated automated test will contain three test units (1), (2), and (3), which can be performed together automatically. The tests may be executed such that a credit status may be checked to see if the results of the test are correct. If a credit check delivers a credit block (e.g., negative credit check), for example, a credit release may be triggered automatically. The result of the credit release may be checked. After test execution, the test results are provided to the user. The results may include documents generated with the example master data. For example, sales orders may be generated with the example master data. As such, the user interface may indicate that the test results for test units (1), (2), and (3) are OK and provide links to the documents, the documents themselves, or a combination of both. The user may review the test results and can initiate variations to the user selections or user inputs (e.g., generate manual tests) and perform further tests. Once the tests results are deemed satisfactory to the user, the solution package may "go live" for the business system 102.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" or "engine" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules, engines, or components are temporarily configured (e.g., programmed), each of the modules, engines, or components need not be configured or instantiated at any one instance in time. For example, where the modules, engines, or components comprise a general-purpose processor configured using software, the general-purpose processor may be configured as respective different modules at different times. Software may accordingly configure the processor to constitute a particular module or engine at one instance of time and to constitute a different module or engine at a different instance of time.

Modules or engines can provide information to, and receive information from, other modules or engines. Accordingly, the described modules and engines may be regarded as being communicatively coupled. Where multiples of such modules and engines exist contemporaneously, communications may be achieved through signal transmission (e.g., over appropriate circuits and buses) that connect the modules and engines. In embodiments in which multiple modules and engines are configured or instantiated at different times, communications between such modules and engines may be achieved, for example, through the storage and retrieval of information in memory structures to which the multiple modules or engines have access. For example, one module may perform an operation and store the output of that operation in a memory device to which it is communicatively coupled. A further module may then, at a later time, access the memory device to retrieve and process the stored output. Modules and engines may also initiate communications with input or output devices and can operate on a resource (e.g., a collection of information).

Figure 6:
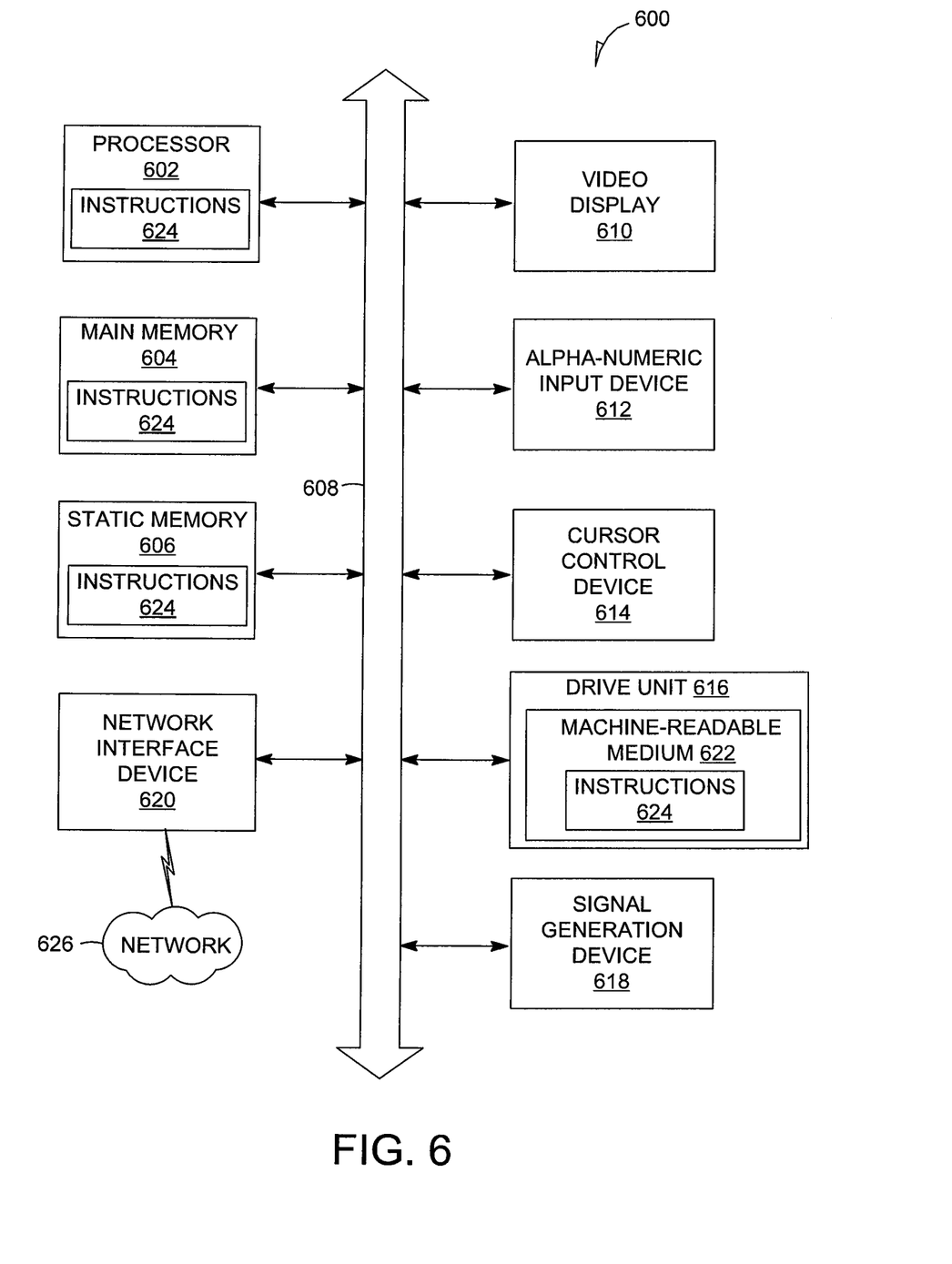
FIG. 6 is a simplified block diagram of a machine in an example form of a computing system within which a set of instructions for causing the machine to perform any one or more of the methodologies discussed herein may be executed.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable storage medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable storage medium 622 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, during runtime, a user selection of a selection option that customizes a solution package for a process;
   creating a customized solution package based on the user selection of the selection option;
   in response to the creating of the customized solution package, automatically generating, using a processor of a machine, an automated test comprising a predefined test unit assigned to the user selection of the selection option during design time of the solution package, the automatically generating includes automatically retrieving the predefined test unit assigned, during design time, to the user selection that causes the creating of the customized solution package during runtime; and
   executing the automated test to determine operability of the customized solution package.

2. The method of claim 1, further comprising automatically generating, in response to the creating of the customized solution package, example master data to be used as data in the automated test, the example master data being based on the user selection of the selection option.

3. The method of claim 2, wherein generating the example master data comprises extracting the example master data from a database containing real world transactions based on the user selection.

4. The method of claim 1, wherein the user selection indicates a country parameter.

5. The method of claim 1, wherein the user selection indicates an industry parameter.

6. The method of claim 1, further comprising:
   receiving an identifier for the solution package to be customized;
   determining selection options for the solution package to be customized based on the identifier; and
   providing a user interface including the selection options from which the user selection is made.

7. The method of claim 1, further comprising maintaining a plurality of predefined test units for the solution package, each test unit of the plurality of predefined test units being assigned to a selection option of a plurality of selection options of the solution package during the design time of the solution package.

8. The method of claim 1, wherein the executing the automated test occurs automatically without human intervention in response to the automatically generating of the automated test, the automatically executing the automated test including obtaining and using example master data generated based on the user selection.

9. The method of claim 1, wherein the generating and executing of the automated tests occurs at a system hosted by a service provider.

10. The method of claim 1, wherein the automatically generating the automated test further comprises retrieving a second test unit, the second test unit being a valid test independent of the user selection.

11. A system comprising:
   a processor of a machine;
   a process selection module configured to receive, during runtime, a user selection of a selection option that customizes a solution package for a process;
   a package generation module configured to create a customized solution package based on the user selection of the selection option;
   a test generation module configured to automatically generate, using the processor and in response to the customized solution package being created, an automated test comprising a predefined test unit assigned to the user selection of the selection option during design time of the solution package, the automatic test being automatically generated by automatically retrieving the predefined test unit assigned, during design time, to the user selection that causes the solution package to be created during runtime; and a test execution module configured to execute the automated test to determine operability of the customized solution package.

12. The system of claim 11, further comprising a master data generation module configured to automatically generate, in response to the customized solution package being created, example master data to be used as data in the automated test based on the user selection of the selection option.

13. The system of claim 11, wherein the process selection module is further configured to receive an identifier for the solution package to be customized and to determine selection options for the solution package to be customized based on the identifier, the system further comprising a user interface module configured to provide a user interface including the selection options from which the user selection is made.

14. The system of claim 11, further comprising a database configured to maintain a plurality of predefined test units for the solution package, each test unit of the plurality of predefined test units being assigned to a selection option of a plurality of selection options of the solution package during the design time of the solution package.

15. A non-transitory machine-readable medium storing instructions which, when executed by the at least one processor of a machine, cause the machine to perform operations comprising:

receiving, during runtime user selection of a selection option that customizes a solution package for a process;

creating a customized solution package based on the user selection of the selection option;

in response to the creating of the customized solution package, automatically generating an automated test comprising a predefined test unit assigned to the user selection of the selection option during design time of the solution package, the automatically generating includes automatically retrieving the predefined test unit assigned, during design time, to the user selection that causes the creating of the customized solution package during runtime; and executing the automated test to determine operability of the customized solution package.

16. The non-transitory machine-readable medium of claim 15, wherein the operations further comprise automatically generating, in response to the creating of the customized solution package; example master data to be used as data in the automated test based on the user selection of the selection option.

17. The non-transitory machine-readable medium of claim 16, wherein the generating the example master data comprises extracting the example master data from a database containing real world transactions based on the user selection.

18. The non-transitory machine-readable medium of claim 15, wherein the user selection indicates at least one of a country parameter or an industry parameter.

19. The non-transitory machine-readable medium of claim 15, wherein the operations further comprise:

receiving an identifier for the solution package to be customized;

determining selection options for the solution package to be customized based on the identifier; and providing a user interface including the selection options from which the user selection is made.

20. The non-transitory machine-readable medium of claim 15, wherein the operations further comprise maintaining a plurality of predefined test units for the solution package, each test unit of the plurality of predefined test units being assigned to a selection option of a plurality of selection options of the solution package during the design time of the solution package.

* * * * *